July 14, 1925.
H. BURRMANN
PULLEY BLOCK
Filed Aug. 8, 1923
1,545,482
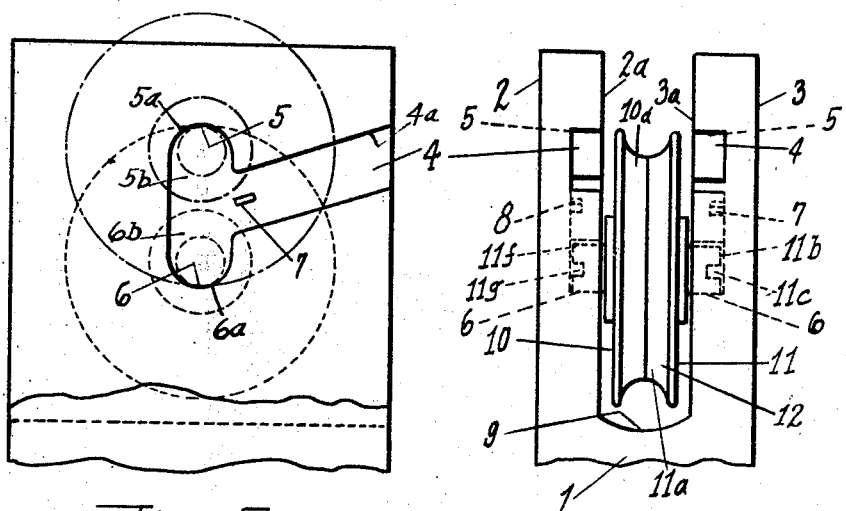
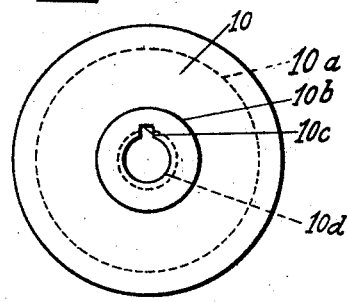
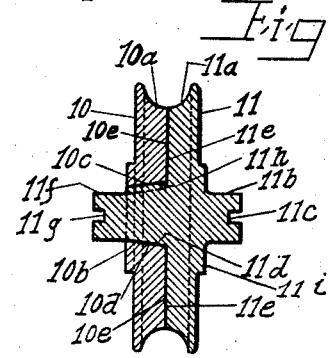
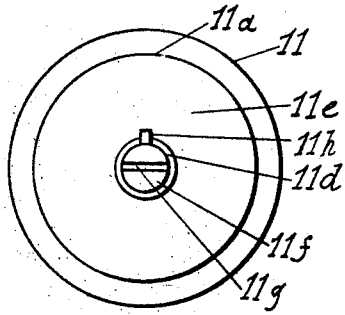
INVENTOR:
HENRY BURRMANN.
BY Andrew L. Chegam
ATTORNEY.

Patented July 14, 1925.

1,545,482

UNITED STATES PATENT OFFICE.

HENRY BURRMANN, OF DAVENPORT, IOWA.

PULLEY BLOCK.

Application filed August 8, 1923. Serial No. 656,331.

*To all whom it may concern:*

Be it known that I, HENRY BURRMANN, a citizen of the United States, residing at Number 2303 Brady Street, in the city of Davenport, in the county of Scott, in the State of Iowa, have invented a new and useful Pulley Block, of which the following is a specification.

My invention relates to improvements in pulley-blocks, in which the pulley is installed within a bifurcation of the block; and the objects of my invention are; first, to provide a pulley block in which the pulley is capable of being readily installed or removed and in which pulleys of varying sizes may be installed without the use of tools, to suit the necessities of the user; second, to provide a pulley capable of being securely installed in its block without the means of bolts, nuts, or rivets; third, to provide for a pulley a block suitable for immediate use with various sizes of pulleys; fourth, to provide for a pulley a block capable of retaining the pulley in position, yet more readily adapted to the speedy installation or removal of the pulley therefrom.

I attain these objects by the mechanism illustrated in the accompanying drawing, in which:—

Figure 1 is a view of a front elevation of the pulley and movable pulley block, disclosing in dotted lines the axle of the pulley and the inner construction of the block, and also the means of retaining the axle in the block.

Fig. 2 is a view in elevation of the inside of a jaw of the movable pulley block in dotted lines disclosing the working of the pulley, under varying conditions.

Fig. 3, is a view in cross section of the pulley disclosing its construction, particularly with reference to the disc and axle of the major member and the fitting of the minor member thereto.

Fig. 4, is a view of a side elevation of a minor member of the pulley, taken on its outside.

Fig. 5, is a view of a side elevation of a major member of the pulley taken on its inside.

Similar numerals refer to similar parts throughout the several views.

Block 1 is the groundwork of my invention. Block 1 has in its end a bifurcation 9, said bifurcation 9, being formed suitable for receiving a pulley 12. Said pulley 12 is formed of a major disc member 11 having hubs $11^b$ and $11^f$, and a hubless, minor disc member 10.

Minor disc member 10 has a hole $10^d$ in its center provided with a key way $10^e$, suitable for fitting upon the tapered portion $11^d$ of hub $11^f$, and to facilitate the snug fitting of minor disc member 10, upon said tapered portion $11^d$ of hub $11^f$ the said hole $10^d$ is also made concave. In order to prevent minor disc member 10 from revolving on the tapered portion $11^d$ of hub $11^f$, I have provided on said tapered portion a fixed longitudinal key $11^h$, suited for engaging said key way $10^e$ provided in the tapered hole $10^d$ of said minor disc member 10.

Upon the outside of major disc member 11, around the hub $11^b$, is provided a raised bearing portion $11^i$, and upon the outside of minor disc member 10, around the hole $10^d$ is provided a similar raised bearing portion $10^b$.

Around the perimeters of major and minor disc members 11 and 10, respectively are provided chamfered surfaces $11^a$ and $10^a$ of a form suited to create a tackle channel when the insides of said major and minor discs are placed in juxtaposition.

Hub ends $11^b$ and $11^f$ are similarly journaled suitable for fitting into channel 4, and to revolve in the grooved hanger boxings 5 and 6 of the block 1; said hub ends $11^b$ and $11^f$ being also provided with transverse grooves $11^c$ and $11^g$, suitable for receiving the channel keys 7 and 8 of said block 1, which channel keys are fitted within channels 4 of block 1, in close proximity to groove hanger boxings 5 and 6 of block 1, their purpose being to aid in retaining said journaled hub ends $11^b$ and $11^f$ within said grooved-hanger-boxings 5 and 6 when said pulley 12 is in operation.

The block 1, has bifurcation 9, which terminates in jaws 2 and 3, presenting inside walls $2^a$ and $3^a$.

Within walls $2^a$ and $3^a$ are provided grooved channels 4 having perpendicular walls $4^a$, said channels being inwardly and downwardly directed, leading into grooved hanger boxings 5 and 6, and said grooved channels 4 are of size suitable for the introduction of hub ends $11^b$ and $11^f$ into said grooved hanger boxings 5 and 6, and in said channels are fixed key pins 7 and 8, which are of dimensions suited to thread grooves $11^c$ and $11^g$ provided in the hub ends $11^b$ and $11^f$ and are for the purpose of facilitating the holding of the pulley in said block when it is not in use, or is jostled in using it, or passing it from grooved hanger boxings 5 and 6 or vice versa.

The pulley is hung in the block by grooved hanger boxings 5 and 6 which are composed of right angular walls $5^a$, $5^b$, $6^a$, $6^b$.

Block 1 and pulley 12 may be constructed of any suitable material.

I claim:

A pulley block comprised of a pulley and block, said block being bifurcated, the walls of said bifurcation being provided with downwardly directioned grooved channels having perpendicular walls, said grooved channels leading into grooved hanger boxings perpendicularly disposed in the walls of said bifurcation in such manner as to suitably loosely engage the hub ends of said pulley when installed therein; key pin means installed within the said grooved channels, positioned near the junction of said grooved channels with said grooved hanger boxings; said pulley having journal hub portions provided with transverse aligned key ways in their extremities, adapted to cooperate with said key pin means, in such way as to admit the said hub ends into the said grooved hanger boxings and facilitate the retaining of said hub ends within said boxings when said pulley block is not in use.

Done at the city of Davenport, in the county of Scott, in the State of Iowa this 3rd day of August A. D. 1923.

HENRY BURRMANN.

Witnesses:
ELIZABETH BURRMANN,
BIRDIE A. CHEZEM.